United States Patent Office.

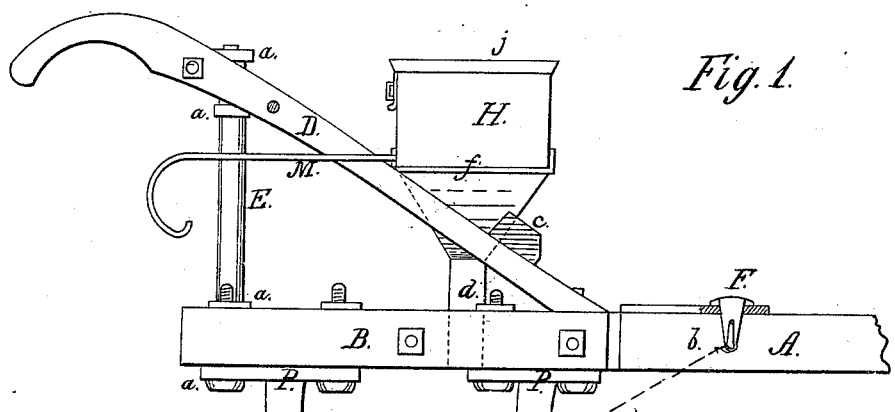
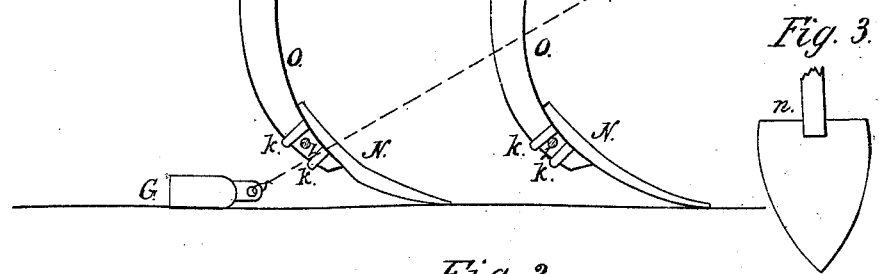
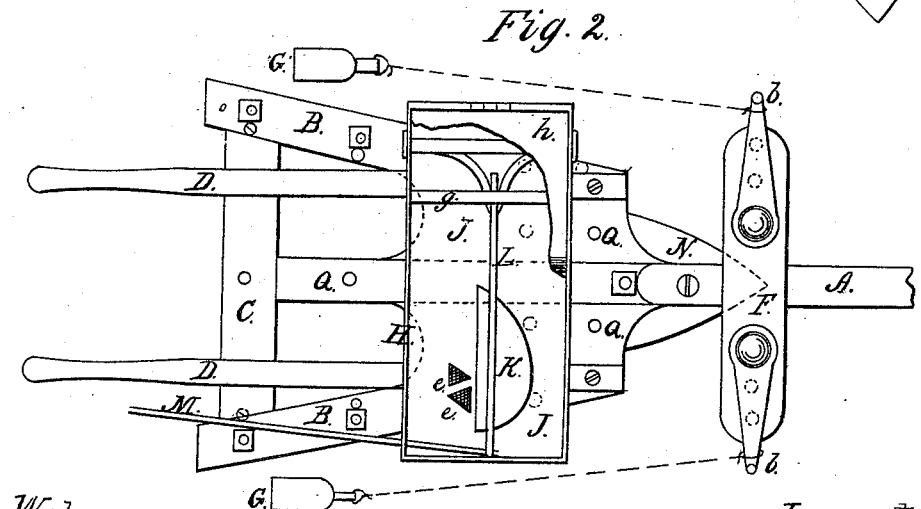

ZACHARIAH B. SIMS, OF BONHAM, TEXAS.

Letters Patent No. 94,349, dated August 31, 1869.

---

IMPROVEMENT IN COTTON-PLOW AND PLANTER.

---

The Schedule referred to in these Letters Patent and making part of the same.

---

*To all whom it may concern:*

Be it known that I, ZACHARIAH B. SIMS, of Bonham, in the county of Fannin, and State of Texas, have invented a new and useful Improvement in Cotton-Plows and Planters; and I do hereby declare the following to be a full, clear and exact description of the same, sufficient to enable others skilled in the art to which my invention appertains, to make and use the same, reference being had to the accompanying drawing, forming part of this specification, in which—

Figure 1 is a side view of the device illustrating my invention.

Figure 2 is a top or plan view thereof.

Figure 3 is a front view of one of the shovels.

Similar letters of reference indicate corresponding parts in the three figures.

My invention consists in certain new and useful improvements in cotton-plows and planters, as will be hereinafter more fully described.

In the drawings—

A represents the plow-beam, provided at its forward end with a suitable clevis.

B are two side-pieces, which are connected to the plow-beam, and extend outwardly to the rear therefrom.

A cross-bar, C, connects the rear ends of the pieces B and beam A.

Suitable screw-rods and nuts are run through the pieces and beam, whereby I produce a strong and serviceable frame-work or stock, adapted for the work to be performed.

The handles D are constructed as ordinarily, and rise from the forward ends of the radial pieces B. They are supported by rods E, which pass through the cross-bar C and the handles, and are jammed on both sides thereof by nuts $a\,a$, so that the handles may be firmly braced, and raised and lowered as desired. Suitable transverse braces may be applied to the handles, to assist in strengthening them.

On the plow-beam A, in front of the forward ends of the pieces B, I secure a cross-bar, F, which extends transversely across it, and to which I attach hooks $b$, the shanks of which are made adjustable transversely.

These hooks are points of suspension for markers G, which consist of suitable weights connected to the hooks by cords or chains, which are of such a length as to allow the weights to drag along the ground, and mark the same, on the forward draught of the plow. The distance between the marks may be readily varied, by moving the hooks accordingly.

H represents the seed-box or hopper, which is mounted on the handles D, and further supported by a bar, $c$, secured thereon.

The spout $d$ communicates with an opening in the plow-beam, and directs the seed to the ground.

Within this hopper, I place ledges, to support a removable valve-plate J.

I intend to employ a series of these plates, having openings $e$, of varying dimensions, in order to increase or decrease the dropping of the seed in the operation of planting.

These plates are to be introduced into the hopper, through an opening, $f$, in its side.

K represents the valve. It consists of a plate adapted to cover and uncover the openings in the plate J, and is secured directly to one end of a spring-strip, L, whose other end is rigidly connected to the hopper in any suitable manner.

A rod, $g$, is placed across the hopper, over the spring, in order to retain the latter in position.

M is a handle, which is secured to the valve or the spring, and passes through the rear of the hopper to within convenient reach of the driver's hands, as readily seen in the drawings.

A plate, $h$, is arranged within the hopper, to guide the seed to the openings in the valve-plate J.

A suitable cover or lid, $j$, is applied to the hopper in any ordinary manner.

The valve is closed by drawing the handle toward the rear of the plow, and in this position should be retained by a nut, catch, or other fastening, located in proper place to take hold of the handle.

It will be seen, that when the plow is being drawn forward, the seeder is readily operated by the driver, who, as he steps forward, lets go of or releases the handle M, and thus opens the valve, by the action of the spring, and the operation is reciprocal whenever the driver manipulates the valve.

The simple construction of the spring-valve assists in the dropping of the seed, the parts being simple, and not liable to clog or get out of order.

N are the plows, which are secured to standards O.

In the present case, these standards are curved, and are made tapering at their lower ends.

On the rear of the plows, I attach loops $k$, which are passed over the tapering ends of the curved standards, and a pin, $l$, passed through the latter between said loops.

It will be perceived, that in operating, the tendency of the plows is to move upward, and the consequence is that they tighten themselves.

The pin $l$ prevents any downward displacement.

In order to more perfectly secure the plows to the standards, I cut out a notch, $n$, in the upper end of each plow, and into the notch, I "let in" a corresponding part of the standard, as seen in fig. 3.

By these means, the connection between the plows and standard is very firm and durable.

To the upper end of the standard, I weld or rivet a plate, P. This forms a broad attachment for the standards to the frame-work of the plow, and constitutes a strong connection for the standards. It allows the adjustment of the plows according to the nature of the plowing to be done. For this purpose, I form a series of openings, Q Q, in the plow-beam A and radial pieces B, and secure the plows in proper position, by means of bolts passing through the plates P and the openings in the frame-work, and otherwise retain them by nuts.

When a single plow is in front, and secured to the plow-beam, and two plows are in the rear, one of each secured to the radial pieces B, a ridge is formed; now place two plows in front and the single plow in the rear, and the result is a furrow.

I produce a practical and serviceable plow, and one adapted for many purposes of cotton cultivation.

Having thus described my invention,

What I claim as new, and desire to secure by Letters Patent, is—

1. The frame, consisting of the plow-beam A and radial pieces B, bolted together, and the cross-bar C, and provided with a series of openings, Q, substantially as and for the purpose described.

2. The handles D, supported on the cross-bar C, and made adjustable by means of screw-rods E, in connection with the series of jam-nuts $a\ a$, substantially as and for the purpose described.

3. The marker, consisting of a weight and cord or chain, in connection with the adjustable hooks $b$.

4. The removable valve-plates J, substantially as and for the purpose described.

5. The valve K, secured to the spring-strip L, and operating as and for the purpose described.

6. The mode of securing the plows to the standards, by means of the loops $k$ and the notch $n$, as described.

7. The plow-standards, having a plate, P, welded or riveted thereto, and made adjustable, as described.

To the above, I have signed my name, this 24th day of May, 1869.

ZACHARIAH B. SIMS.

Witnesses:
JOHN A. WIEDERSHEIM,
PHIL. F. LARNER.